(12) United States Patent
Kinashi

(10) Patent No.: US 9,172,324 B2
(45) Date of Patent: Oct. 27, 2015

(54) MOTOR DRIVE SYSTEM

(71) Applicant: ICHINOMIYA DENKI CO., LTD., Hyogo (JP)

(72) Inventor: Yoshikazu Kinashi, Hyogo (JP)

(73) Assignee: Ichinomiya Denki Co., Ltd., Hyogo (JP)

( * ) Notice: Subject to any disclaimer, the term of this patent is extended or adjusted under 35 U.S.C. 154(b) by 257 days.

(21) Appl. No.: 13/908,323

(22) Filed: Jun. 3, 2013

(65) Prior Publication Data

US 2014/0002001 A1     Jan. 2, 2014

(30) Foreign Application Priority Data

Jun. 28, 2012 (JP) ................................. 2012-146057
Oct. 18, 2012 (JP) ................................. 2012-230760

(51) Int. Cl.
| | |
|---|---|
| *H02P 1/46* | (2006.01) |
| *H02P 25/22* | (2006.01) |
| *H02K 3/28* | (2006.01) |
| *H02K 11/00* | (2006.01) |
| *H02K 16/04* | (2006.01) |

(52) U.S. Cl.
CPC *H02P 25/22* (2013.01); *H02K 3/28* (2013.01); *H02K 11/0031* (2013.01); *H02K 16/04* (2013.01)

(58) Field of Classification Search
USPC .................. 318/724, 122, 7; 310/49.06, 49.19
See application file for complete search history.

(56) References Cited

U.S. PATENT DOCUMENTS

| | | | |
|---|---|---|---|
| 6,194,849 B1 | 2/2001 | Wilson-Jones et al. | |
| 6,211,631 B1 | 4/2001 | Wilson-Jones et al. | |
| 6,313,558 B1 * | 11/2001 | Abukawa et al. | 310/429 |
| 6,787,959 B2 | 9/2004 | Weimer | |
| 6,911,795 B2 | 6/2005 | Matsuoka et al. | |
| 7,806,225 B2 | 10/2010 | Itoh | |
| 8,575,880 B2 * | 11/2013 | Grantz | 318/724 |
| 8,604,730 B2 * | 12/2013 | Suzuki | 318/400.02 |
| 2002/0047451 A1 | 4/2002 | Weimer | |
| 2004/0114576 A1 | 6/2004 | Itoh | |
| 2009/0133956 A1 | 5/2009 | Itoh | |

FOREIGN PATENT DOCUMENTS

| | | |
|---|---|---|
| JP | 2000-500102 | 1/2000 |
| JP | 2002-142397 | 5/2002 |
| JP | 2004-201364 | 7/2004 |
| JP | 2007-331639 | 12/2007 |

* cited by examiner

*Primary Examiner* — Eduardo Colon Santana
*Assistant Examiner* — Iftekhar Mustafa
(74) *Attorney, Agent, or Firm* — Jordan and Hamburg LLP

(57) ABSTRACT

A motor drive system has a brushless motor having coils classified into a group A and a group B, a stator having 12 teeth, around each of which any one of the coils classified into the group A and the group B is wound, and a shaft and a rotor which are provided inside the stator; a controller which applies three-phase voltages to each coil of the group A; a controller which applies the three-phase voltages to each coil of the group B; and a sensor portion which outputs an electric signal according to the rotation angle of the shaft to the controllers. Both the total number of the coils of the group A and the total number of the coils of the group B are 6.

5 Claims, 10 Drawing Sheets

MOTOR DRIVE SYSTEM

TECHNICAL FIELD

The present invention relates to a three-phase brushless motor to which two electrically independent controllers are connected and a motor drive system.

BACKGROUND OF THE INVENTION

For example, in vehicles, a brushless motor is used as a drive source for assisting the rotation of a steering and the like. Moreover, the brushless motor is used also as a drive source which rotates a steering when detecting the lane of a road and a vehicle running immediately ahead, and then automatically operating a vehicle based on a signal of the detection.

As described above, the brushless motor used as the drive source which rotates a steering has been required to have high reliability. Furthermore, the brushless motor has been required to be designed in such a manner as to perform a minimum function even when a failure, such as disconnection, occurs in coils constituting the brushless motor. For example, Patent Literature 1 discloses a configuration such that a switching unit, which is movable between a closed position at which current flows in each phase winding and an open position at which current does not flow, operates when a failure occurs.

Patent Literature 2 discloses a configuration such that two or more power electronics each are provided in a stator having a winding portion separated into two or more portions as a starter generator system of vehicles.

CITATION LIST

Patent Literature

Patent Literature 1: Japanese Unexamined Patent Application Publication No. 2000-500102
Patent Literature 2: Japanese Unexamined Patent Application Publication No. 2002-142397

SUMMARY OF INVENTION

In automatic operation of vehicles, a brushless motor used as a drive source which rotates a steering has been required to have a structure of generating torque which rotates the steering even when a failure occurs, i.e., a design concept of double safety.

For example, in a case where two sets, each containing a brushless motor as a drive source which rotates a steering and a controller, are simply provided, even when a failure occurs in one set, torque which rotates the steering can be given by the other set. However, providing the two sets doubles the cost and the space, and therefore such a structure is not realistic.

When two electrically independent coils each are wound around each of the teeth of a stator of the brushless motor, two coil groups which generate rotating magnetic fields in an electrically independent manner are provided in one brushless motor as an outer shape. However, since there is a necessity of arranging an insulating material for insulating the two coils around the teeth, the capacity occupied by the coils decreases corresponding to the space occupied by the insulating material. As a result, a problem such that the output of the motor decreases occurs.

The present invention has been made in view of the above-described circumstances. It is an object of the invention to provide a three-phase brushless motor which satisfies the design concept of double safety and which can suppress a reduction in output and cost increase and a motor drive system having such a three-phase brushless motor.

(1) A motor drive system according to the present invention has: a motor having a plurality of coils classified into a group A and a group B, a stator having a plurality of teeth, around each of which any one of the coils classified into the group A and the group B is wound and which are arranged in an annular shape, a rotor shaft which is provided inside the stator and extends in the axial direction, and a rotor which is externally fitted to the rotor shaft; a first controller which applies three-phase voltages of a U phase, a V phase, and a W phase to each coil classified into the group A; a second controller which applies the three-phase voltages to each coil classified into the group B; and a sensor portion which outputs an electric signal according to a rotation angle of the rotor shaft to the first controller and the second controller. The number X of magnetic poles of the teeth of the stator and the number Y of magnetic poles of magnets of the rotor satisfy Expression 1. The total number of the coils when the teeth of the stator are set as one unit is the same as the number X of magnetic poles of the teeth. Both the total number of the coils contained in the group A and the total number of the coils contained in the group B are X/2. The first controller and the second controller apply the three-phase voltages to the corresponding coils, irrespective of whether the other controller applies the three-phase voltages to the coils. An induced voltage of each coil in each of the group A and the group B constitutes the three phases and the phase of the induced voltage of each coil of the same phase in each of the groups is the same. There is a phase difference between the induced voltage of each coil contained in the group A and the induced voltage of each coil contained in the group B.

$$X:Y=6n:6n\pm2 \qquad \text{[Expression 1]}$$

(In Expression 1, n is an integer of 2 or more.)

According to the configuration described above, a system which rotates the motor is multiplexed (duplicated) and each system is configured to be electrically independently operable irrespective of the operation state of the other system. Thus, a double safety system can be achieved in which even when an abnormality occurs in one system, the motor can be rotated by the other system. Moreover, since there is no necessity of winding the two electrically independent coils around each of the teeth of the stator, there is no necessity of securing a space for arranging the insulating material between the coils.

Herein, "the controllers are electrically independent" refers to the fact that the first controller and the second controller do not exchange information with each other and one controller can operate without being affected by the operation state of the other controller. More specifically, the second controller can apply the three-phase voltages to the coils of the group B, irrespective of whether the system from the first controller to the coils of the group A normally operates or stops. Similarly, the first controller can apply the three-phase voltages to the coils of the group A, irrespective of whether the system from the second controller to the coils of the group B normally operates or stops.

(2) Preferably, the sensor portion has a first sensor and a second sensor each having a resolver stator having a plurality of resolver teeth, around each of which an excitation winding, a first output winding, and a second output winding are wound and which are arranged in an annular shape and a resolver rotor which is provided inside the resolver stator and integrally rotates with the rotor shaft. The first controller applies an excitation voltage to the excitation winding of the first sensor and detects the rotation angle of the rotor shaft based on the combination of the output voltages of the first output winding and the second output winding of the first sensor. The second controller applies an excitation voltage to the excitation winding of the second sensor and detects the rotation angle of the rotor shaft based on the combination of the output voltages of the first output winding and the second output winding of the second sensor.

According to the configuration described above, the system of detecting the rotation angle of the rotor shaft is multiplexed (duplicated in this embodiment) and each system is configured to be independently operable. Thus, a double safety system can be achieved in which even when an abnormality occurs in one system, the other system can continue the detection of the rotation angle of the rotor shaft.

(3) The motor drive system may be one in which the number X of magnetic poles of the teeth is 12, the number Y of magnetic poles of the magnets is 10 or 14.

Since the phase of the induced voltage of each coil of the same phase in each of the group A and the group B is the same, a synthesized voltage of a plurality of coils becomes the maximum, so that the output of the motor improves.

A three-phase brushless motor according to the present invention has: a stator in which a coil is wound around each of a plurality of teeth and which generates a rotating magnetic field by applying three-phase voltages of a U phase, a V phase, and a W phase to each coil from two electrically independent controllers; and a rotor which has a plurality of magnets and is rotated by the rotating magnetic field of the stator. The number X of magnetic poles of the teeth of the stator and the number Y of magnetic poles of the magnets of the rotor satisfy Expression 1 above. The total number of the coils when the teeth of the stator are set as one unit is the same as the number X of magnetic poles of the teeth. Each of the coils is classified into a group A and a group B according to the controller, to which the coil is connected, of the controllers. Both the total number of the coils contained in the group A and the total number of the coils contained in the group B are X/2.

The three-phase voltages of a U phase, a V phase, and a W phase are applied to each coil from the two independent controllers, so that a rotating magnetic field occurs. Thus, even when disconnection or the like occurs in the coils contained in either the group A or the group B, a rotating magnetic field is generated by the coils contained in the other group, so that the rotor rotates. Since there is no necessity of winding two electrically independent coils around each of the teeth of the stator, there is no necessity of securing the space for arranging an insulating material between the coils.

According to the three-phase brushless motor and the motor drive system according to the invention, double safety is achieved and a reduction in the output of the motor and cost increase are suppressed.

DESCRIPTION OF THE PREFERRED EMBODIMENTS

Hereinafter, the invention is described in detail based on preferable embodiments with reference to the drawings as appropriate. The embodiments are merely examples of the invention and can be altered as appropriate in a range where the gist of the invention is not changed.

Embodiment 1

Schematic Configuration of Brushless Motor 10

Figure 1:
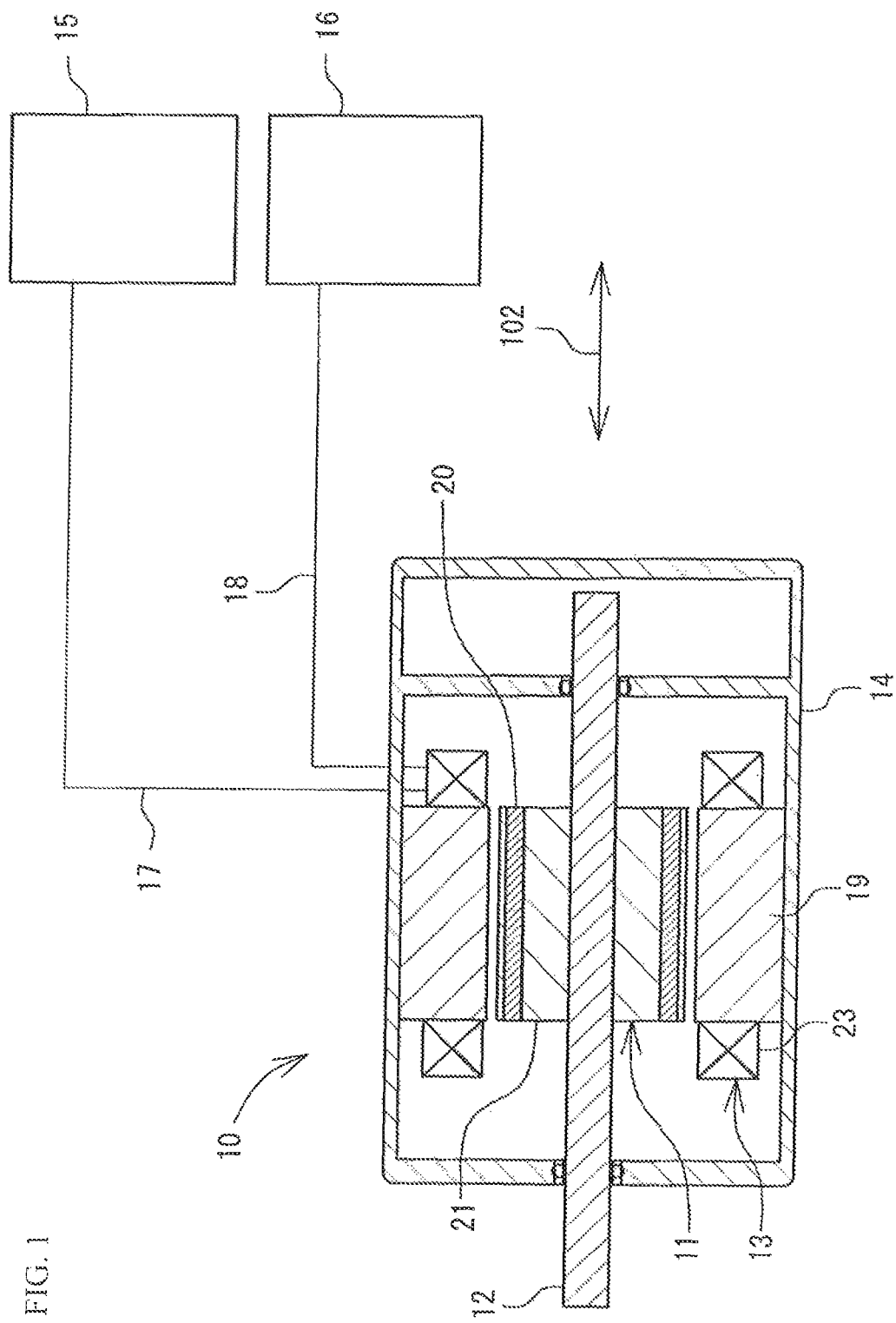
FIG. 1 is a schematic view illustrating the configuration of a brushless motor 10 and controllers 15 and 16 according to Embodiment 1 of the invention.

A brushless motor 10 illustrated in FIG. 1 has a rotor 11, a shaft 12, a stator 13, a housing 14, and the like. The housing 14 houses the rotor 11, the shaft 12, and the stator 13 therein. The brushless motor 10 is electrically connected to two controllers 15 and 16 which supply electric power by harnesses 17 and 18. Each of the controllers 15 and 16 is electrically connected to coils 23 of the stator 13. The electric power supplied from each of the controllers 15 and 16 is applied to each coil 23. Each of the controllers 15 and 16 supplies three-phase voltages of a U phase, a V phase, and a W phase. A motor drive system according to Embodiment 1 is constituted by the brushless motor 10 and the controllers 15 and 16.

Figure 2:
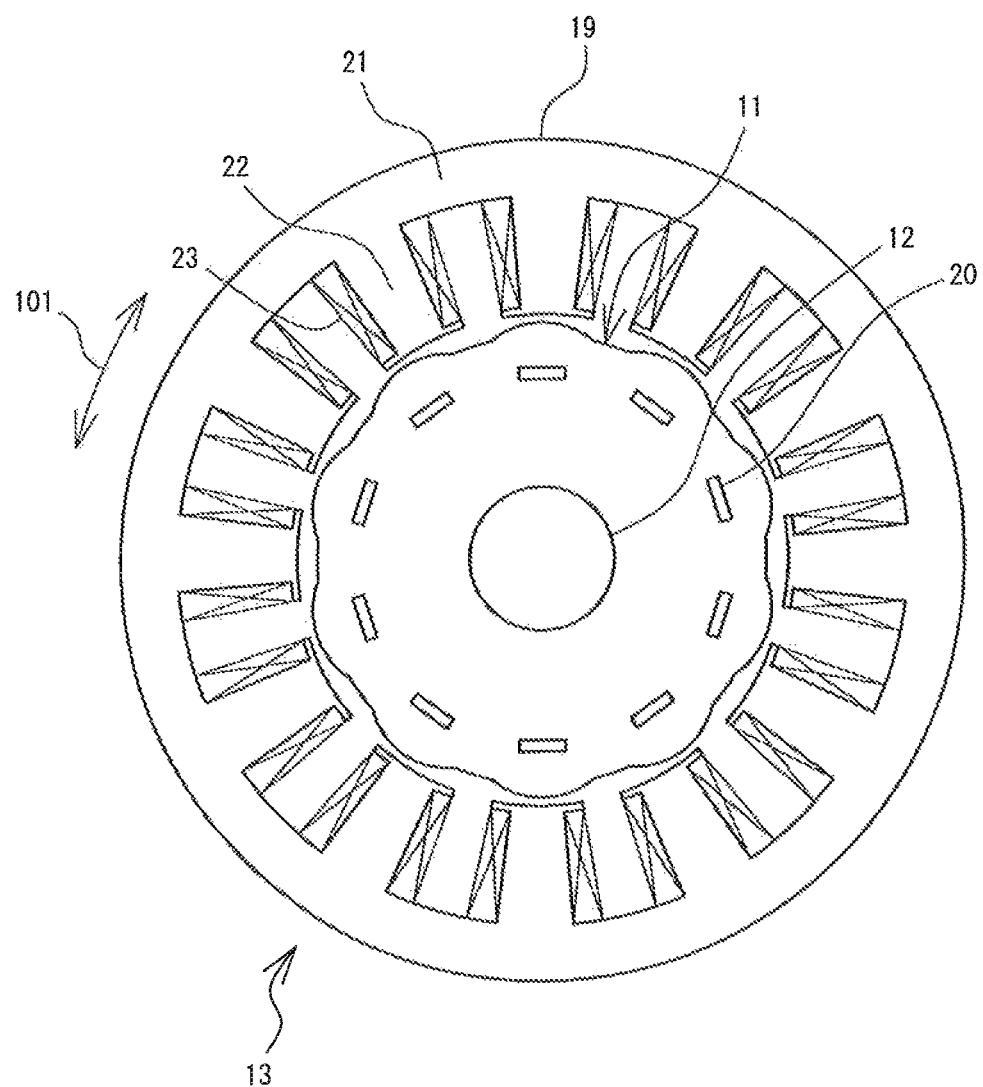
FIG. 2 is a plan view illustrating the internal configuration of the brushless motor 10.

As illustrated in FIGS. 1 and 2, the rotor 11 has an approximately cylindrical shape and is provided with ten magnets 20 which are equally separated along a circumferential direction 101. In the rotor 11, a plurality of steel sheets having a disk shape as viewed in plan in FIG. 2 are laminated in an axial direction 102 and are bonded to each other by crimping to be integrated. In the steel sheets, ten penetration holes are formed at intervals in a circumferential direction 101 and columnar-shaped magnets 20 are inserted into the penetration holes and are fixed by an adhesive or the like. A penetration hole is formed also in the center of the rotor 11, and the shaft 12 is press-fitted into the penetration hole. The shaft 12 is rotatably supported by the housing 14 through a bearing.

As illustrated in FIGS. 1 and 2, the stator 13 is one in which the coils 23 are wound around a stator core 19 having an approximately cylindrical shape. In the stator core 19, a plurality of steel sheets having a shape as viewed in plan in FIG. 2 are laminated in the axial direction 102 and are bonded to each other by crimping to be integrated. The stator core 19 has a core yoke 21 at the peripheral side and 12 teeth 22 projected to the center of the cylinder from the core yoke 12 are arranged at an equal interval in the circumferential direction 101. The coil 23 is wound around each of the teeth 22. Each coil 23 is electrically connected to only either one of the controllers 15 and 16 and generates a magnetic field based on the electric power given from the controller 15 or 16.

Figure 3:
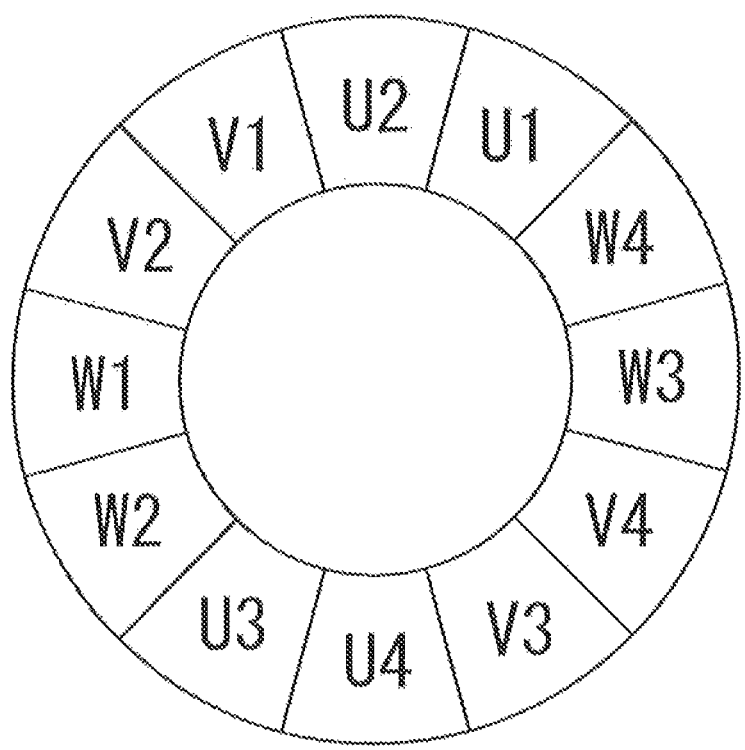
FIG. 3 is an arrangement diagram of coils 23 in a stator 13.

As illustrated in FIG. 3, the 12 coils 23 wound around the teeth 22 of the stator core 19 are classified into three phases of a U phase, a V phase, and a W phase according to the phase of the voltage applied from the controllers 15 and 16. In FIG. 3, four coils 23 are classified into the U phase and are indicated as U1, U2, U3, and U4. Four coils 23 are classified into the V phase and are indicated as V1, V2, V3, and V4. Four coils 23 are classified into the W phase and are indicated as W1, W2, W3, and W4.

In the stator 13, the coils 23 of the phases are clockwise arranged from the position at 12:00 in FIG. 3 in the order of U2, U1, W4, W3, V4, V3, U4, U3, W2, W1, V2, and V1. By the arrangement, the phases of the induced voltages are the same in the two coils 23 indicated as U2 and U4 and the phases of the induced voltages are the same in the two coils 23 indicated as U1 and U3 in the U phase. Between the induced voltages of the two coils 23 indicated as U2 and U4 and the induced voltages of the two coils 23 indicated as U1 and U3, a phase difference in which the electric angle is 30° arises.

In the V phase, the phases of the induced voltages are the same in the two coils 23 indicated as V2 and V4 and the phases of the induced voltages are the same in the two coils 23 indicated as V1 and V3. Between the induced voltages of the two coils 23 indicated as V2 and V4 and the induced voltages of the two coils 23 indicated as V1 and V3, a phase difference in which the electrical degree is 30° arises.

In the W phase, the phases of the induced voltages are the same in the two coils 23 indicated as W2 and W4 and the phases of the induced voltages are the same in the two coils 23 indicated as W1 and W3. Between the induced voltages of the two coils 23 indicated as W2 and W4 and the induced voltages of the two coils 23 indicated as W1 and W3, a phase difference in which the electrical degree is 30° arises.

Herein, among the 12 coils 23, the coil group containing the six coils 23 connected to the controller 15 is set as the group A and the coil group containing the six coils 23 connected to the controller 16 is set as the group B. The group A contains the six coils 23 constituting the three phases of U1, U3, V1, V3, W1, and W3. The group B contains the six coils 23 constituting the three phases of U2, U4, V2, V4, W2, and W4. The six coils 23 contained in the group A and the six coils 23 contained in the group B are electrically independent from each other.

Figure 4:
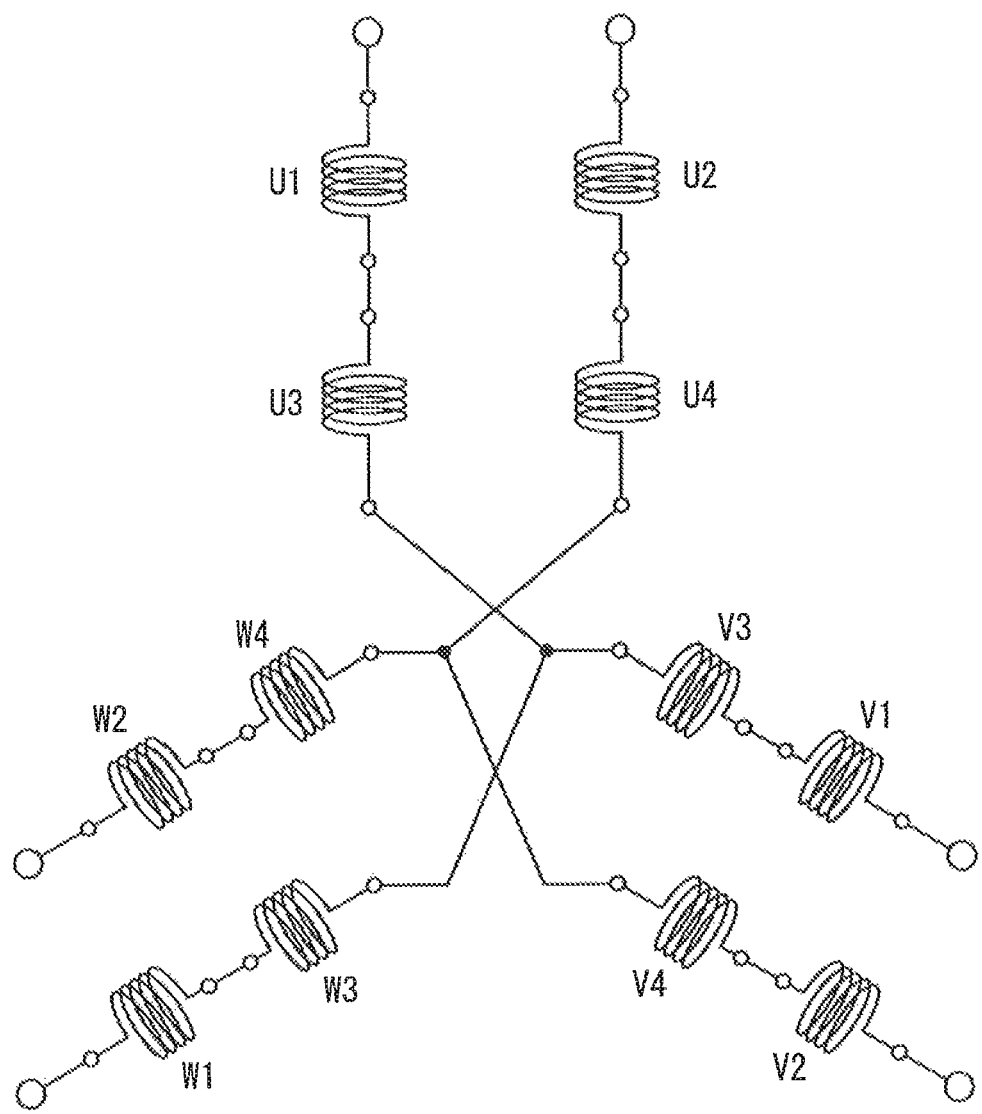
FIG. 4 is a connection wiring diagram of the coils 23.

As illustrated in FIG. 4, in the six coils 23 contained in the group A, U1 and U3 are connected in series, V1 and V3 are connected in series, W1 and W3 are connected in series, and the two U-phase coils 23, the two V-phase coils 23, and the two W-phase coils 23 are star-connected. In the six coils 23 contained in the group B, U2 and U4 are connected in series, V2 and V4 are connected in series, W2 and W4 are connected in series, and the two U-phase coils 23, the two V-phase coils 23, and the two W-phase coils 23 are star-connected.

Figure 5:
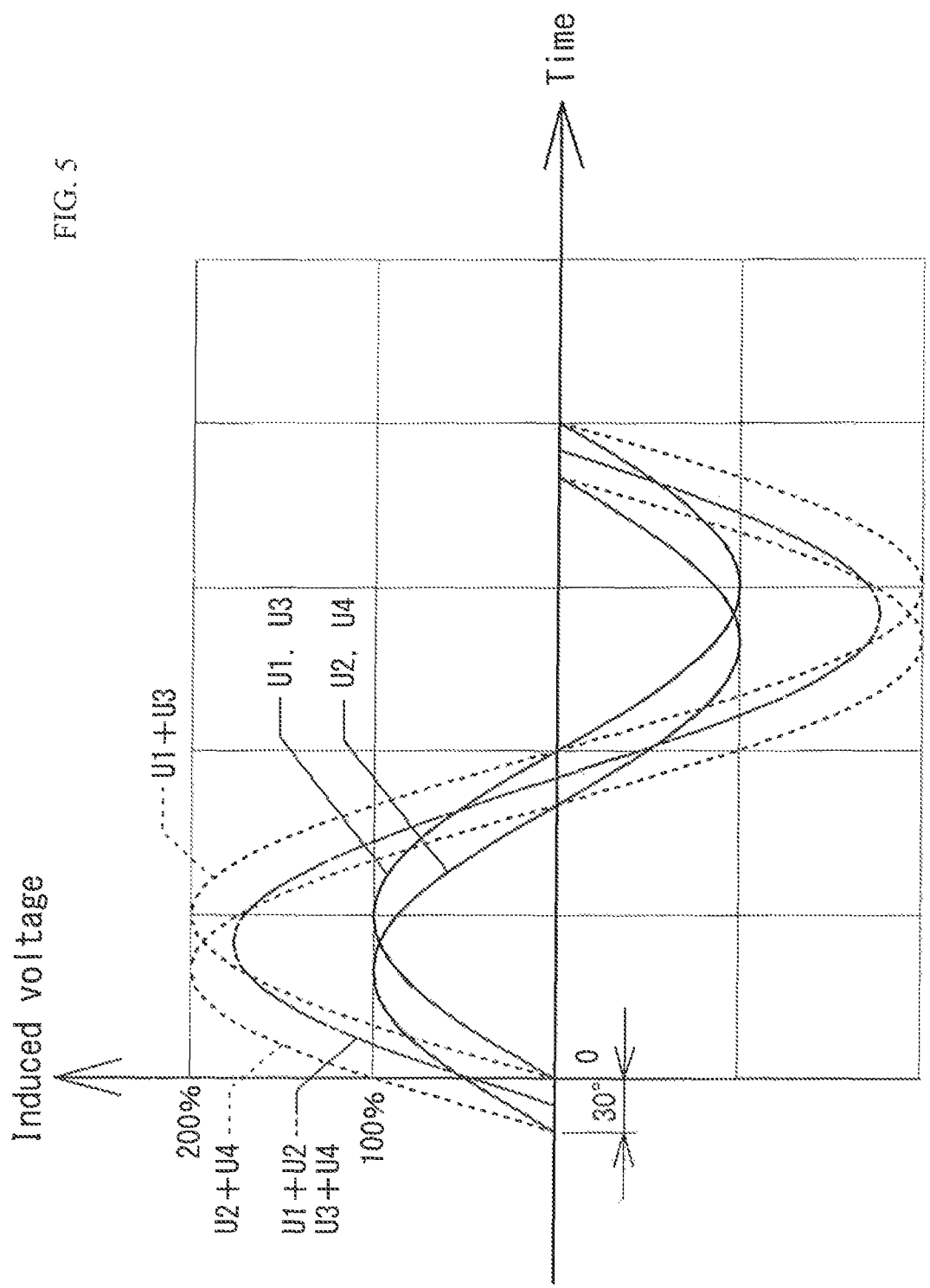
FIG. 5 is a view illustrating induced voltages of U phases of the stator 13.

FIG. 5 shows induced voltages when electric power is applied to the U-phase four coils 23 (U1, U2, U3, U4) from the controllers 15 and 16. The two coils 23 (U1, U3) contained in the group A have the same phase and the two coils 23 (U2, U4) contained in the group B have the same phase as illustrated by the solid line in FIG. 5. Thus, the synthesized induced voltages of the two coils 23 in the group A and the group B become twice (200%) as illustrated by the dashed lines. When it is supposed that a phase difference in which the electrical degree is 30° arises in the two coils 23, the synthesized induced voltage is given by 0.966×200% as illustrated by the dotted lines. Thus, due to the fact that the two coils 23 (U1, U3) contained in the group A have the same phases and the two coils 23 (U2, U4) contained in the group B have the same phases, the synthesized induced voltages of the coils 23 in each group becomes the maximum.

The three-phase voltages of the U phase, the V phase, and the W phase are applied to each coil 23 from the two independent controllers 15 and 16, so that a rotating magnetic field is generated as described above. Thus, even when disconnection or the like occurs in the six coils 23 contained in either the group A or the group B, a rotating magnetic field is generated by the six coils 23 contained in the other group, so that the rotor 11 rotates. Since there is no necessity of winding two electrically independent coils around each of the teeth 22 of the stator core 19, there is no necessity of securing the space for arranging an insulating material between the coils.

Since the phases of the induced voltages of the two coils 23 of the same phase in each of the group A and the group B are the same, the synthesized voltage of the two coils 23 becomes the maximum, so that the output of the brushless motor 10 improves.

Figure 6:
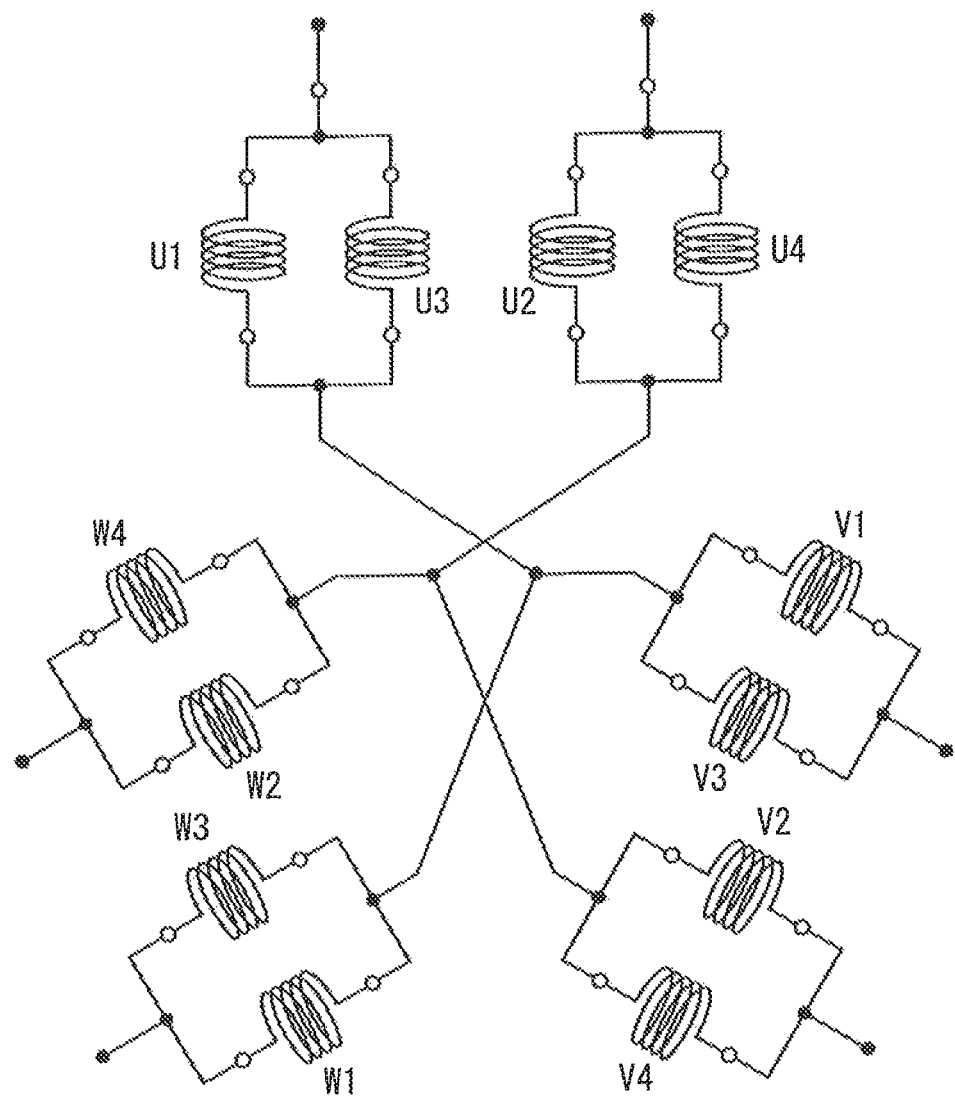
FIG. 6 is a connection wiring diagram of the coils 23 according to a modification.

In the embodiment described above, the two coils 23 of the same phase are connected in series in the six coils 23 contained in the group A or the group B. As illustrated in FIG. 6, however, the two coils 23 of the same phase may be connected in parallel. More specifically, in the six coils 23 contained in the group A, U1 and U3 are connected in parallel, V1 and V3 are connected in parallel, W1 and W3 are connected in parallel, and the two coils 23 of the U phase, the two coils 23 of the V phase, and the two coils 23 of the W phase may be star-connected. In the six coils 23 contained in the group B, U2 and U4 are connected in parallel, V2 and V4 are connected in parallel, W2 and W4 are connected in parallel, and the two coils 23 of the U phase, the two coils 23 of the V phase, and the two coils 23 of the W phase may be star-connected.

Although, in the embodiment described above, the brushless motor 10 is configured so that ten magnets 20 are arranged at the rotor 11 and the number Y of magnetic poles of the magnets is 10, the same operation and effect as those of the embodiment described above are demonstrated even when the brushless motor 10 is configured so that 14 magnets are arranged at the rotor 11 and the number Y of magnetic poles of the magnets is 14.

The embodiment described above discloses the brushless motor 10 in which the number X of magnetic poles of the teeth of the stator 13 is 12 and the number Y of magnetic poles of the magnets of the rotor 11 is 10. In the invention, however, the number X of magnetic poles of the teeth of the stator and the number Y of magnetic poles of the magnets of the rotor may satisfy Expression 1.

$$X:Y=6n:6n\pm2 \qquad \text{[Expression 1]}$$

(In Expression 1, n is an integer of 2 or more.)

In this case, the total number of the coils when the teeth of the stator are set as one unit is the same as the number X of magnetic poles of the teeth. Both the total number of the coils contained in the group A and the total number of the coils contained in the group B are X/2.

Figure 7:
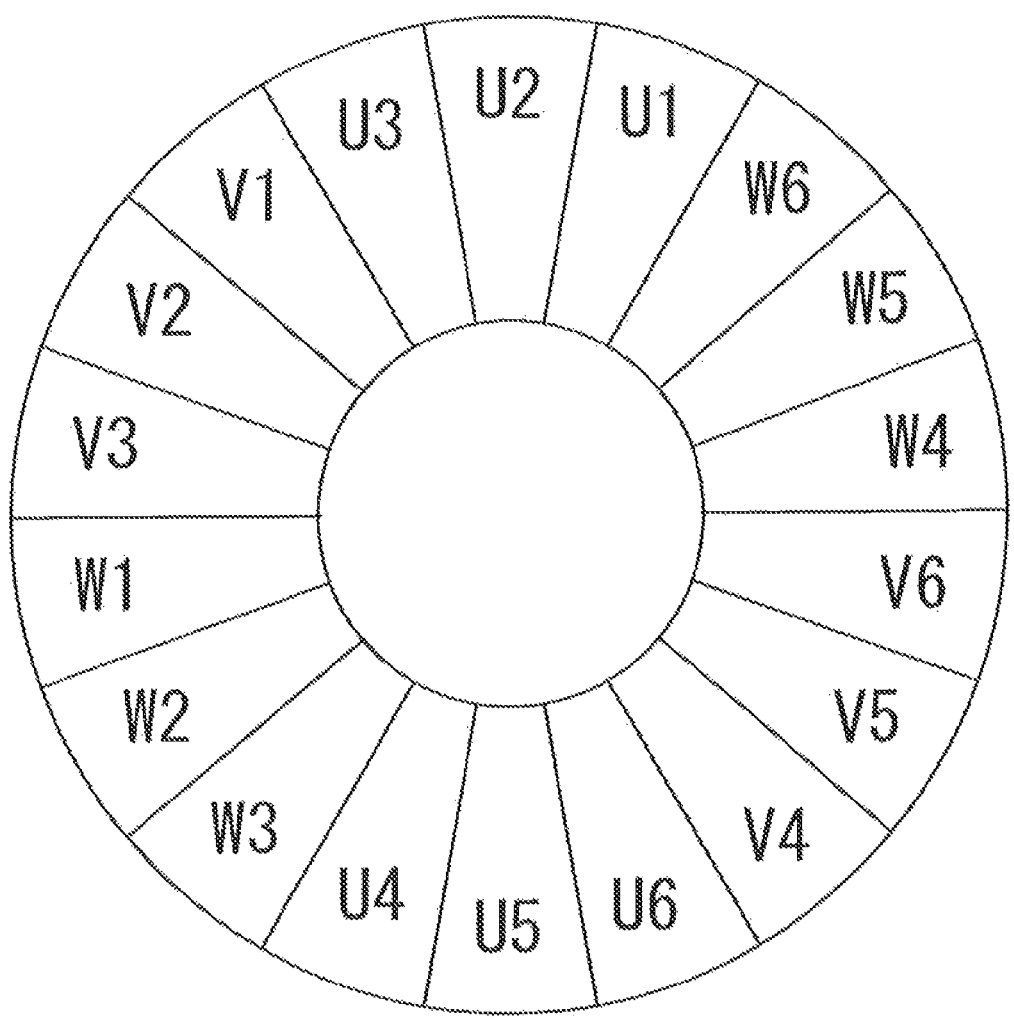
FIG. 7 is an arrangement diagram of the coils 23 when the number X of magnetic poles of teeth is 18.
Figure 8:
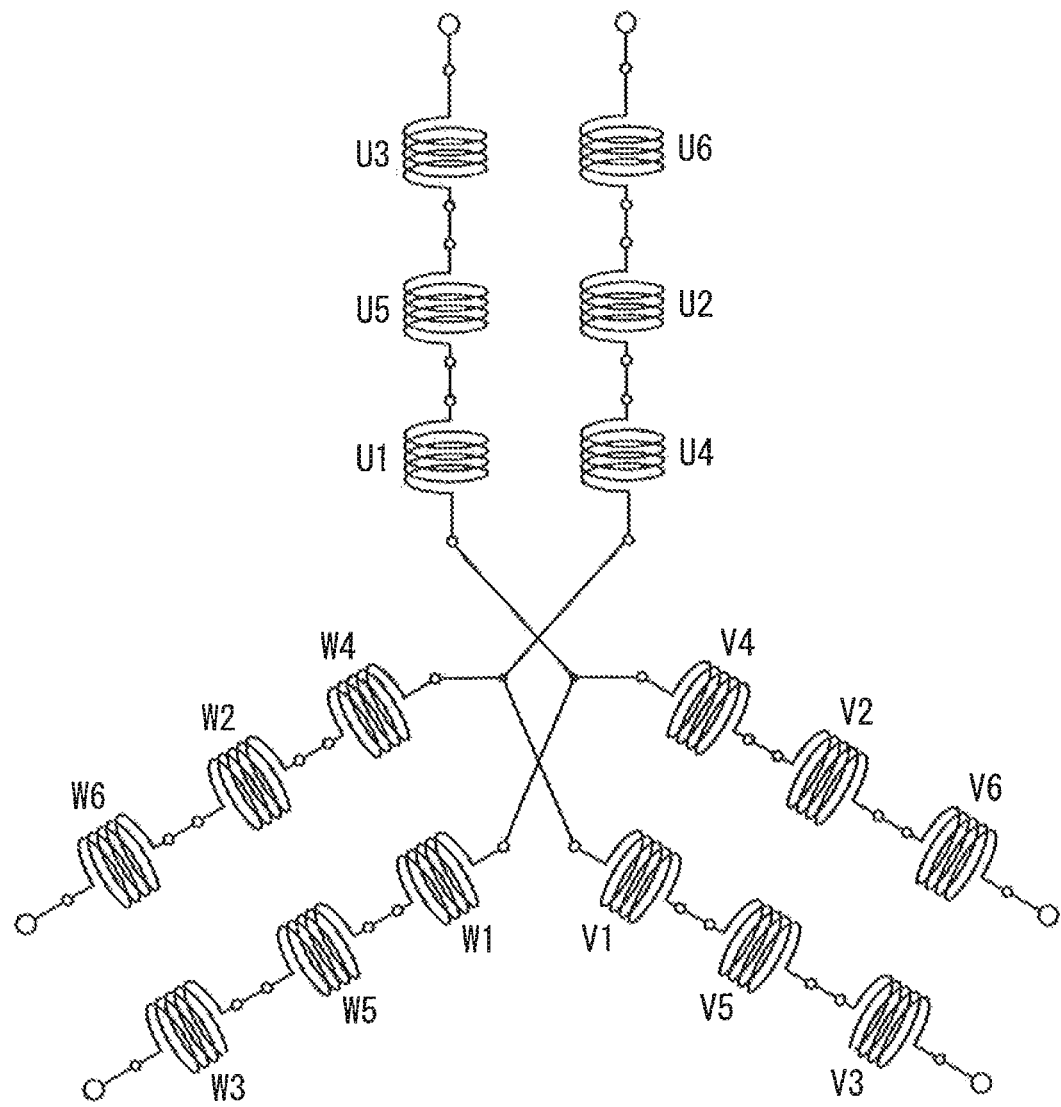
FIG. 8 is a connection wiring diagram of the coils 23 when the number X of magnetic poles of the teeth is 18.

Thus, for example, as illustrated in FIGS. 7 and 8, the number X of magnetic poles of the teeth of the stator 13 may be 18. Although not illustrated in the figures, the number Y of magnetic poles of magnets of the brushless motor 10 to be attached to the stator 13 is 16 or 20.

In the stator 13, the coils 23 of the phases are clockwise arranged from the position at 12:00 in FIG. 7 in the order of U2, U1, W6, W5, W4, V6, V5, V4, U6, U5, U4, W3, W2, W1, V3, V2, V1, and U3. By the arrangement, the phases of the induced voltages are the same in the two coils 23 indicated as U1 and U4, the phases of the induced voltages are the same in the two coils 23 indicated as U2 and U5, and the phases of the induced voltages are the same in the two coils 23 indicated as U3 and U6 in the U phase. Between the induced voltages of the two coils 23 indicated as U1 and U4 and the induced voltages of the two coils 23 indicated as U2 and U5, a phase difference in which the electric angle is 20° arises. Between the induced voltages of the two coils 23 indicated as U2 and U5 and the induced voltages of the two coils 23 indicated as U3 and U6, a phase difference in which the electrical degree is 20° arises.

In the V phase, the phases of the induced voltages are the same in the two coils 23 indicated as V1 and V4, the phases of the induced voltages are the same in the two coils 23 indicated as V2 and V5, and the phases of the induced voltages are the same in the two coils 23 indicated as V3 and V6. Between the induced voltages of the two coils 23 indicated as V1 and V4 and the induced voltages of the two coils 23 indicated as V2 and V5, a phase difference in which the electrical degree is 20° arises. Between the induced voltages of the two coils 23 indicated as V2 and V5 and the induced voltages of the two coils 23 indicated as V3 and V6, a phase difference in which the electrical degree is 20° arises.

In the W phase, the phases of the induced voltages are the same in the two coils 23 indicated as W1 and W4, the phases of the induced voltages are the same in the two coils 23 indicated as W2 and W5, and the phases of the induced voltages are the same in the two coils 23 indicated as W3 and W6. Between the induced voltages of the two coils 23 indicated as W1 and W4 and the induced voltages of the two coils 23 indicated as W2 and W5, a phase difference in which the electrical degree is 20° arises. Between the induced voltages of the two coils 23 indicated as W2 and W5 and the induced voltages of the two coils 23 indicated as W3 and W6, a phase difference in which the electrical degree is 20° arises.

Herein, among the 18 coils 23, the coil group containing the nine coils 23 connected to the controller 15 is set as the group A and the coil group containing the nine coils 23 connected to the controller 16 is set as the group B. The group A contains the nine coils 23 constituting the three phases of U1, U3, U5, V1, V3, V5, W1, W3, and W5. The group B contains the nine coils 23 constituting the three phases of U2, U4, U6, V2, V4, V6, W2, W4, and W6. The nine coils 23 contained in the group A and the nine coils 23 contained in the group B are electrically independent from each other.

As illustrated in FIG. 8, in the nine coils 23 contained in the group A, U1, U3, and U5 are connected in series, V1, V3, and V5 are connected in series, W1, W3, and W5 are connected in series, and the three U-phase coils 23, the three V-phase coils 23, and the three W-phase coils 23 are star-connected. In the nine coils 23 contained in the group B, U2, U4, and U6 are connected in series, V2, V4, and V6 are connected in series, W2, W4, and W6 are connected in series, and the three U-phase coils 23, the three V-phase coils 23, and the three W-phase coils 23 are star-connected.

Thus, the same operation and effect as those of the embodiment described above are demonstrated even when the brushless motor 10 is configured so that the number X of magnetic poles of the teeth of the stator 13 is 18.

Embodiment 2

Next, a motor drive system according to Embodiment 2 of the invention is described with reference to FIGS. 9 and 10. Since a fundamental configuration is common to that of FIG. 1, the constituent components common to those of FIG. 1 are designated by the same reference numerals, a detailed description thereof is omitted, and the description is given focusing on differences.

Figure 9:
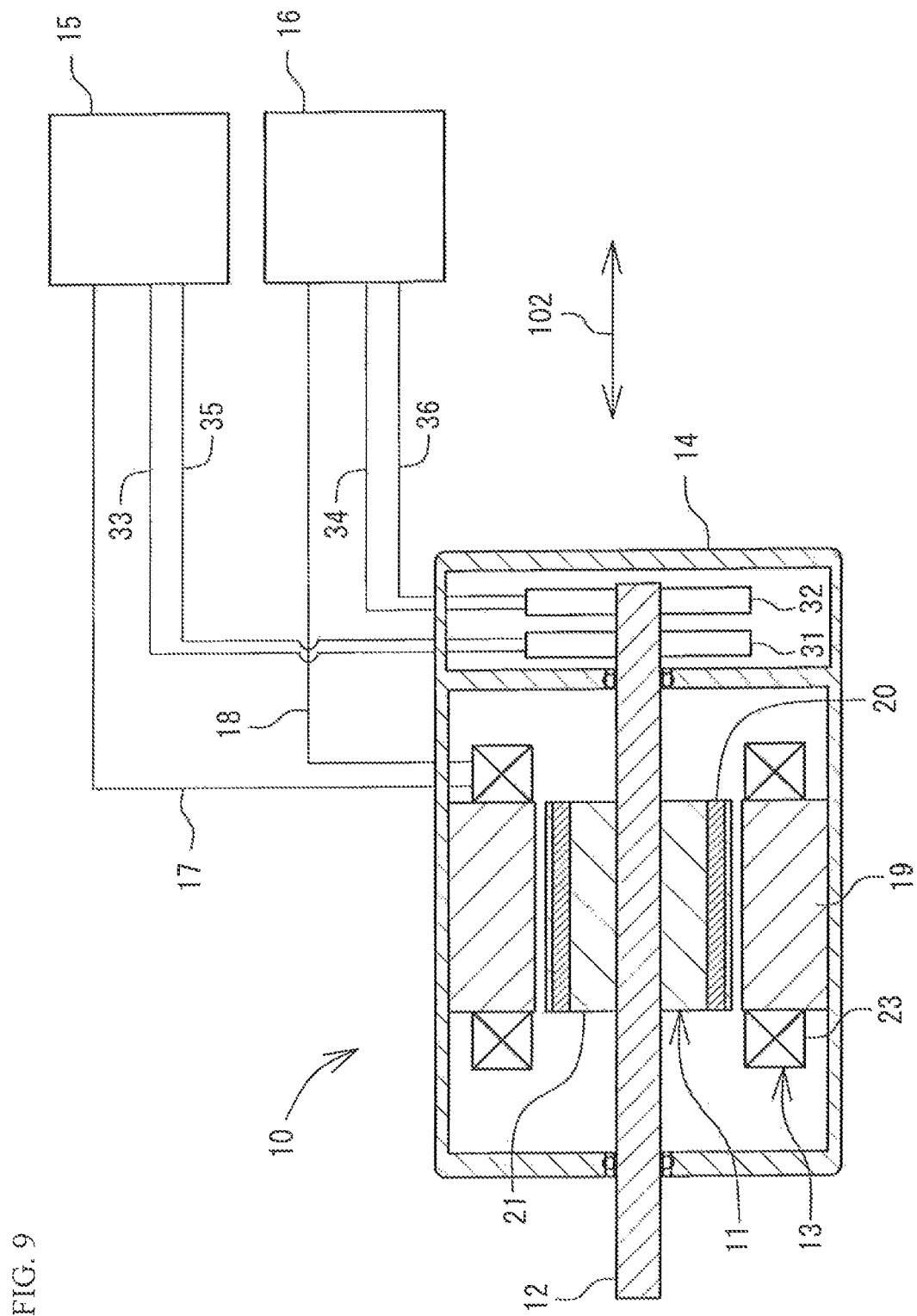
FIG. 9 is a schematic view illustrating the configuration of a motor drive system according to Embodiment 2 of the invention.

As illustrated in FIG. 9, the motor drive system according to Embodiment 2 is different from that of Embodiment 1 in that the brushless motor 10 further has a first resolver 31 (first sensor) and a second resolver 32 (second sensor). The first resolver 31 and the second resolver 32 are sensors which output electric signals according to the rotation angle of a shaft 12 (rotor shaft). A sensor portion according to Embodiment 2 is constituted by the two sensors.

Figure 10:
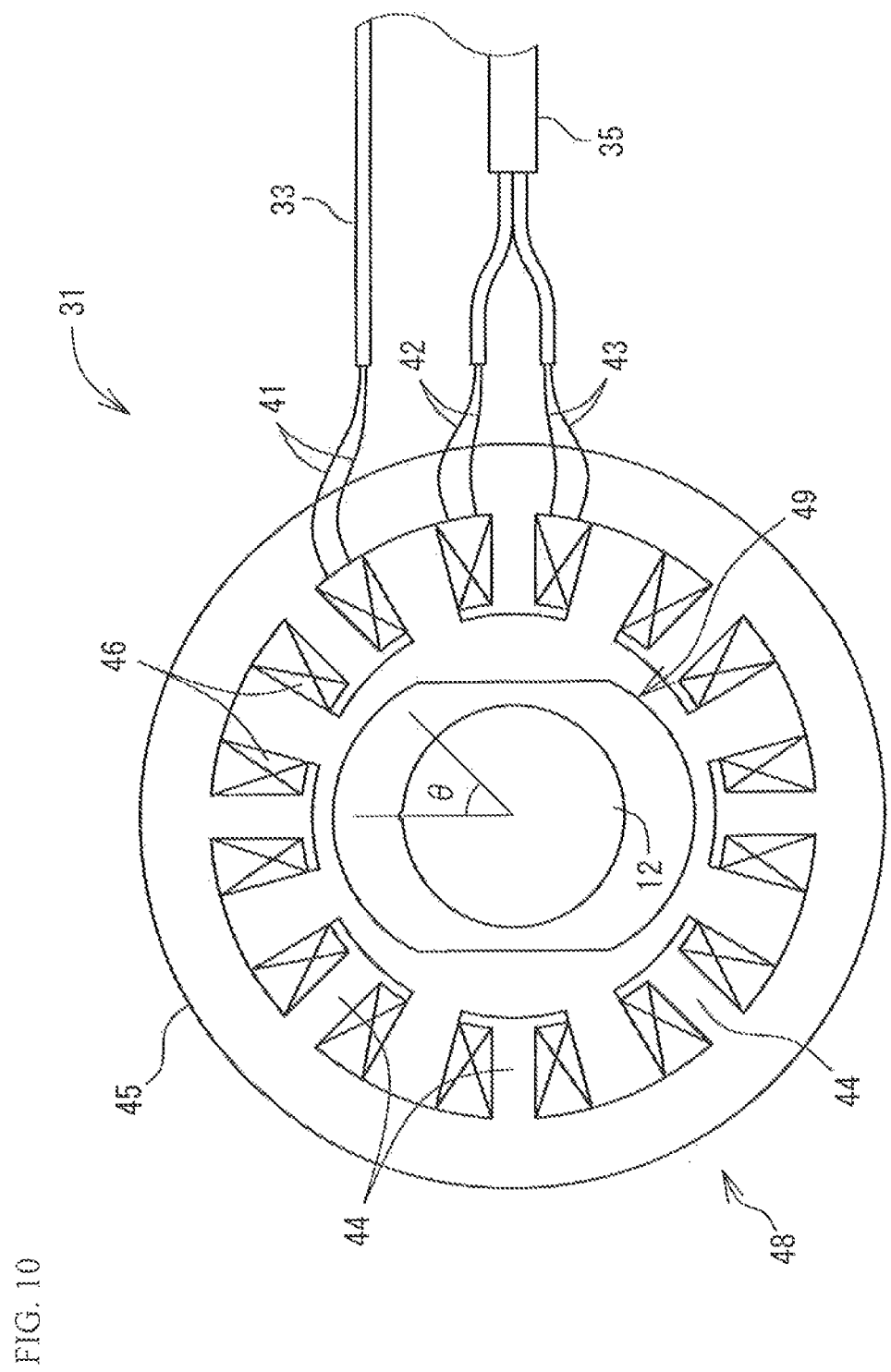
FIG. 10 is a schematic view illustrating the configuration of a first resolver 31.

As illustrated in FIG. 10, the first resolver 31 has a resolver rotor 49 and a resolver stator 48 having resolver teeth 44, a stator body 45, and sensor coils 46. The first resolver 31 in this embodiment 2 is a so-called variable reluctance type resolver in which winding is not wound around the resolver rotor 49.

The stator body 45 is configured to have an approximately cylindrical shape, in which eight resolver teeth 44 are projected from the inner circumferential surface to the inner side in the diameter direction. Thus, the eight resolver teeth 44 are arranged in an annular shape. The stator body 45 is obtained by pressing a steel plate of a predetermined thickness into a shape as viewed in plan in FIG. 10, for example, laminating a plurality of the steel plates, and then integrally fixing the steel plates by crimping or the like. The number of the resolver teeth 44 is not limited to eight. The stator body 45 may have ten resolver teeth 44, for example. The number of the resolver teeth 44 is changed as appropriate according to the number of salient poles of the resolver rotor 49, for example.

Excitation coils 41 (excitation winding), first coils 42 (first output winding), and second coils 43 (second output winding) are wound around each of the resolver teeth 44 of the stator body 45 in the predetermined winding direction. Thus, the sensor coils 46 are constituted in the stator body 45. The first coil 42 and the second coil 43 are wound around each of the resolver teeth 44 in such a manner that the phase varies by 90°. For the winding of the excitation coils 41, the first coils 42, and the second coils 43, a flyer type or a nozzle type winding machine is used, for example. In FIG. 10, the excitation coils 41, the first coils 42, and the second coils 43 are all illustrated as the sensor coils 46.

The resolver rotor 49 is arranged inside the eight resolver teeth 44 provided in the resolver stator 48. More specifically, the resolver rotor 49 and the eight resolver teeth 44 face each other at a predetermined interval in the diameter direction of the resolver stator 48. The resolver rotor 49 is coaxially fixed to the shaft 12 of the brushless motor 10. More specifically, the resolver rotor 49 is configured in such a manner as to be integrally rotatable with the shaft 12.

The resolver rotor 49 is obtained by laminating a plurality of steel plates having an approximately oval shape as viewed in plan, and then fixing the steel plates by crimping or the like. The peripheral of the resolver rotor 49 is formed into a shape in which the gap permeance between the resolver rotor 49 and the resolver stator 48 changes in the shape of a sine wave relative to the angle q in the rotation direction of the resolver rotor 49. In this embodiment 2, although the resolver rotor 49 is provided with salient poles at two places of an outer shape, the number of the salient poles is not limited to two. For example, the salient poles may be formed at three places of an outer shape of the resolver rotor 49.

The first resolver 31 of the configuration described above is electrically connected to the controller 15 (first controller) by harnesses 33 and 35. In more detail, the controller 15 applies an excitation voltage to the excitation coils 41 through the harness 33. When the rotor 12 rotates in this state, SIN output voltages are output from the first coils 42 and COS output voltages are output from the second coils 42. The output voltages are transmitted to the controller 15 through the harness 35. The controller 15 detects the rotation angle q of the shaft 12 based on the combination of the SIN output voltages and the COS output voltages acquired from the first resolver 31 through the harness 35.

Since the configuration of the second resolver 32 is common to that of the first resolver 31, the repeated description is omitted. The second resolver 32 is electrically connected to the controller 16 (second controller) by harnesses 34 and 36. In more detail, an excitation voltage is applied to the excitation coils of the second resolver 32 from the controller 16 through the harness 34 and SIN output voltages and COS output voltages are output from the first coils and the second coils to the controller 16 through the harness 36 with the rotation of the rotor 12. More specifically, the first resolver 31 and the second resolver 32 have the same configuration and the same operation and are different in the controller to which the resolver is connected, i.e., the controller 15 or the controller 16.

In the motor drive system of the configuration described above, the three-phase voltages of the U phase, the V phase, and the W phase are supplied to the coils 23 belonging to the group A from the controller 15 and the three-phase voltages of the U phase, the V phase, and the W phase are supplied to the coils 23 belonging to the group B from the controller 16 similarly as in Embodiment 1.

Herein, when there are no abnormalities in the brushless motor 10 (for example, when disconnection does not occur in all the coils 23 belonging to the group A and the group B, the harness 17 and 18, and the like), the three-phase voltages applied to the coils 23 belonging to the group A and the group B from the controllers 15 and 16 are synchronized by a control circuit which is not illustrated. Between the controllers 15 and 16, however, information exchange for synchronizing the voltages applied to the coils 23 is not performed and the controllers 15 and 16 operate independently from each other.

When there are no abnormalities in the sensor portion (for example, when disconnection does not occur in the sensor coils 46, the harnesses 33 to 36, and the like), the controllers 15 and 16 detect the rotation angle q of the shaft 12 based on the output voltages acquired from the first resolver 31 and the second resolver 32, respectively. In this case, the rotation angle q of the shaft 12 detected by the controllers 15 and 16 shifts by the phase difference of the electrical degree of the adjacent coils 23. More specifically, in the example of FIG. 3, the rotation angle q of the shaft 12 detected by the controllers 15 and 16 shifts by 30° and, in the example of FIG. 7, the rotation angle q of the shaft 12 detected by the controllers 15 and 16 shifts by 20°.

On the other hand, when disconnection or the like occurs in the coils 23 belonging to the group A or the harness 17, the controller 15 cannot apply the three-phase voltages to the coils 23 belonging to the group A. However, the shaft 12 can be rotated by applying the three-phase voltages to the coils 23 belonging to the group B by the controller 16. Although the rotation torque in this case is inferior to that in the case where the three-phase voltages are applied from both the controllers 15 and 16, the brushless motor 10 can be rotated even when an abnormality occurs in the system from the controller 15 to the coils 23 belonging to the group A. Even when an abnormality occurs in the system from the controller 16 to the coils 23 belonging to the group B, the shaft 12 can be rotated by applying the three-phase voltages to the coils 23 belonging to the group A by the controller 15 similarly as above.

More specifically, the controller 16 can rotate the shaft 12 by applying the three-phase voltages to the coils 23 belonging to the group B, irrespective of whether the system from the controller 15 to the coils 23 belonging to the group A operates. Similarly, the controller 15 can rotate the shaft 12 by applying the three-phase voltages to the coils 23 belonging to the group A, irrespective of whether the system from the controller 16 to the coils 23 belonging to the group B operates. More specifically, the controllers 15 and 16 can apply the three-phase voltages to the corresponding coils 23, irrespective of whether the other controller applies the three-phase voltages to the corresponding coils 23. It can be said that the controllers 15 and 16 are electrically independent from the drive of the brushless motor 10.

When disconnection or the like occurs in the sensor coils 46 of the first resolver 31 or the harnesses 33 and 35, the controller 15 cannot detect the rotation angle q of the shaft 12. However, the controller 16 can detect the rotation angle q of the shaft 12 based on the electric signal output from the second resolver 32. More specifically, even when an abnormality occurs in the system from the first resolver 31 to the controller 15, the entire motor drive system can appropriately acquire the rotation angle q of the shaft 12. Even when an abnormality occurs in the system from the second resolver 32 to the controller 16, the rotation angle q of the shaft 12 can be detected based on the electric signal output from the first resolver 31 in the controller 15 similarly as above.

More specifically, the controller 16 can acquire the rotation angle q of the shaft 12 from the second resolver 32, irrespective of whether the system from the first resolver 31 to the controller 15 operates. Similarly, the controller 15 can acquire the rotation angle q of the shaft 12 from the first resolver 31, irrespective of whether the system from the second resolver 32 to the controller 16 operates. More specifically, the controllers 15 and 16 can acquire the rotation angle q of the shaft 12 from the corresponding resolver, irrespective of whether the other controller acquires the rotation angle q of the shaft 12 from the corresponding resolver. It can be said that the controllers 15 and 16 are electrically independent in the acquisition of the rotation angle q of the shaft 12 from the sensor portion.

Thus, in the motor drive system according to Embodiment 2, both the system of rotating the brushless motor 10 and the system of detecting the rotation angle q of the shaft 12 are duplicated and each system is configured to be independently operable. As a result, a double safety system can be achieved in which even when an abnormality occurs in one system, the other system can continue the operation.

Although Embodiment 2 describes the configuration in which the sensor portion is duplicated, either one of the first resolver 31 and the second resolver 32 may be omitted. For example, when the second resolver 32 is omitted, the first resolver 31 may receive the supply of an excitation voltage from the controller 15 (or an oscillator which is not illustrated) and may output an SIN output voltage and a COS output voltage to both the controllers 15 and 16.

REFERENCE SIGNS LIST

10 Brushless motor
11 Rotor
12 Shaft
13 Stator
15,16 Controller
20 Magnet
22 Teeth
23 Coil
31 First resolver
32 Second resolver
41 Excitation coil
42 First coil
43 Second coil
44 Resolver teeth
48 Resolver stator
49 Resolver rotor

The invention claimed is:

1. A motor drive system, comprising:
a motor having a plurality of coils classified into a group A and a group B, a stator having a plurality of teeth, around each of which any one of the coils classified into the group A and the group B is wound and which are arranged in an annular shape, a rotor shaft which is provided inside the stator and extends in the axial direction, and a rotor which is externally fitted to the rotor shaft;
a first controller which applies three-phase voltages of a U phase, a V phase, and a W phase to each coil classified into the group A;
a second controller which applies the three-phase voltages to each coil classified into the group B; and
wherein a sensor portion outputs an electric signal according to a rotation angle of the rotor shaft to the first controller and the second controller;
wherein a number X of magnetic poles of the teeth of the stator and a number Y of magnetic poles of magnets of the rotor satisfy Expression 1, X:Y=6n:6n±2, wherein, n is an integer of 2 or more;
wherein a total number of the coils when the teeth of the stator are set as one unit is equal to the number X of magnetic poles of the teeth;
wherein both a total number of the coils contained in the group A and a total number of the coils contained in the group B is X/2;
wherein the first controller and the second controller apply the three-phase voltages to the corresponding coils, irrespective of whether the other controller applies the three-phase voltages to the coils;
wherein an induced voltage of each coil in each of the group A and the group B constitutes the three phases and the phase of the induced voltage of each coil of the same phase in each of the groups is the same;
wherein there is a phase difference between the induced voltage of each coil contained in the group A and the induced voltage of each coil contained in the group B; and
wherein the sensor portion has a first sensor and a second sensor each having a resolver stator having a plurality of resolver teeth, around each of which an excitation winding, a first output winding, and a second output winding are wound and which are arranged in an annular shape and a resolver rotor which is provided inside the resolver stator and integrally rotates with the rotor shaft.

2. A motor drive system, comprising:
a motor having a plurality of coils classified into a group A and a group B, a stator having a plurality of teeth, around each of which any one of the coils classified into the group A and the group B is wound and which are arranged in an annular shape, a rotor shaft which is provided inside the stator and extends in the axial direction, and a rotor which is externally fitted to the rotor shaft;
a first controller which applies three-phase voltages of a U phase, a V phase, and a W phase to each coil classified into the group A;
a second controller which applies the three-phase voltages to each coil classified into the group B; and
wherein a sensor portion outputs an electric signal according to a rotation angle of the rotor shaft to the first controller and the second controller;
wherein a number X of magnetic poles of the teeth of the stator and a number Y of magnetic poles of magnets of the rotor satisfy Expression 1, X:Y=6n:6n±2, wherein, n is an integer of 2 or more;
wherein a total number of the coils when the teeth of the stator are set as one unit is equal to the number X of magnetic poles of the teeth;
wherein both a total number of the coils contained in the group A and a total number of the coils contained in the group B is X/2;
wherein the first controller and the second controller apply the three-phase voltages to the corresponding coils, irrespective of whether the other controller applies the three-phase voltages to the coils;
wherein an induced voltage of each coil in each of the group A and the group B constitutes the three phases and the phase of the induced voltage of each coil of the same phase in each of the groups is the same;
wherein there is a phase difference between the induced voltage of each coil contained in the group A and the induced voltage of each coil contained in the group B;
wherein the sensor portion has a first sensor and a second sensor each having a resolver stator having a plurality of resolver teeth, around each of which an excitation winding, a first output winding, and a second output winding are wound and which are arranged in an annular shape and a resolver rotor which is provided inside the resolver stator and integrally rotates with the rotor shaft;
wherein the first controller applies an excitation voltage to the excitation winding of the first sensor and detects a rotation angle of the rotor shaft based on a combination of output voltages of the first output winding and the second output winding of the first sensor; and
wherein the second controller applies an excitation voltage to the excitation winding of the second sensor and detects the rotation angle of the rotor shaft based on the combination of the output voltages of the first output winding and the second output winding of the second sensor.

3. The motor driving system according to claim 1, wherein the number X of magnetic poles of the teeth is 12 and the number Y of magnetic poles of the magnets is 10 or 14.

4. The motor driving system according to claim 1, wherein the first controller applies an excitation voltage to the excitation winding of the first sensor and detects a rotation angle of the rotor shaft based on a combination of output voltages of the first output winding and the second output winding of the first sensor.

5. The motor driving system according to claim 1, wherein the second controller applies an excitation voltage to the excitation winding of the second sensor and detects the rotation angle of the rotor shaft based on the combination of the output voltages of the first output winding and the second output winding of the second sensor.

* * * * *